Jan. 14, 1964
H. REES
3,117,348
INJECTION-MOLDING MACHINE
Filed Jan. 22, 1962
7 Sheets-Sheet 2
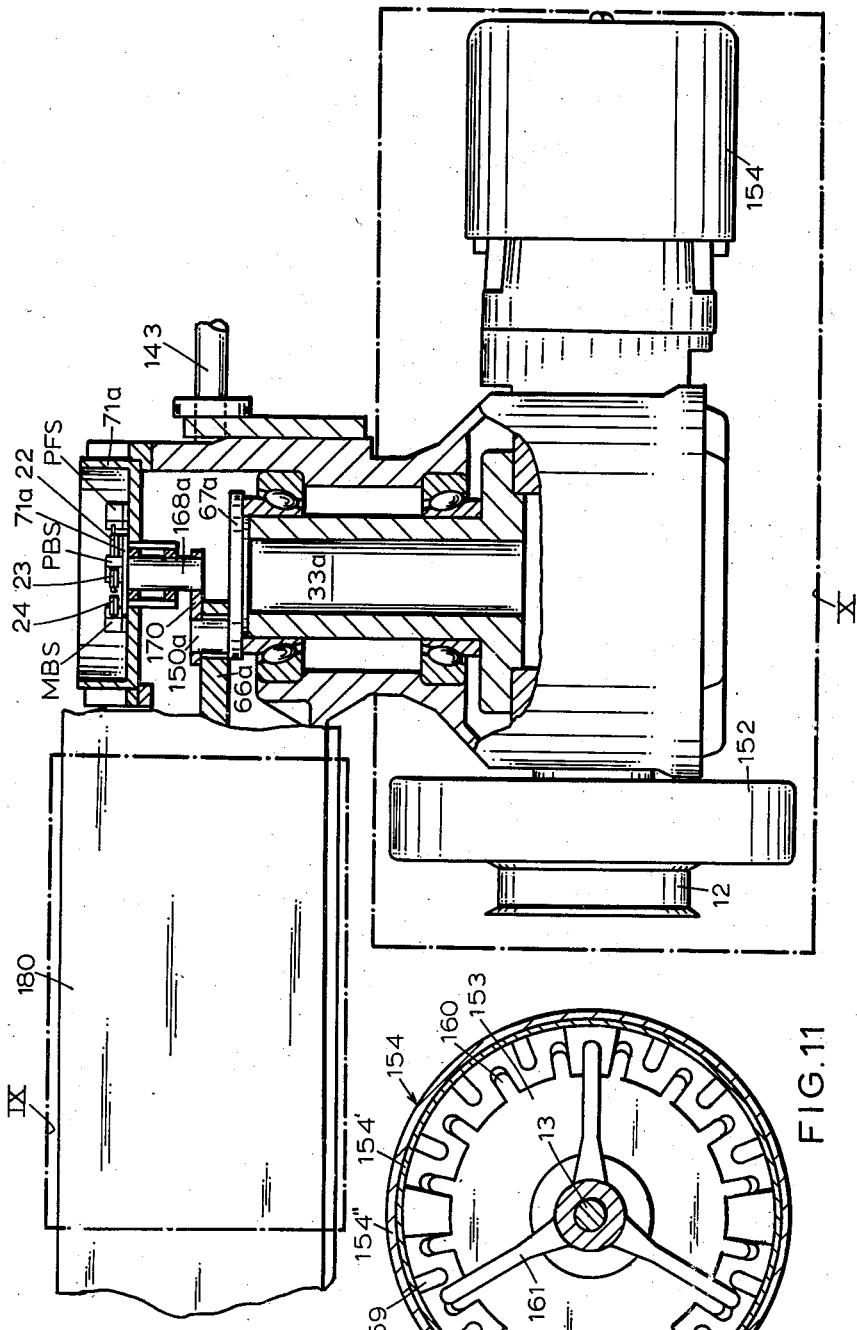
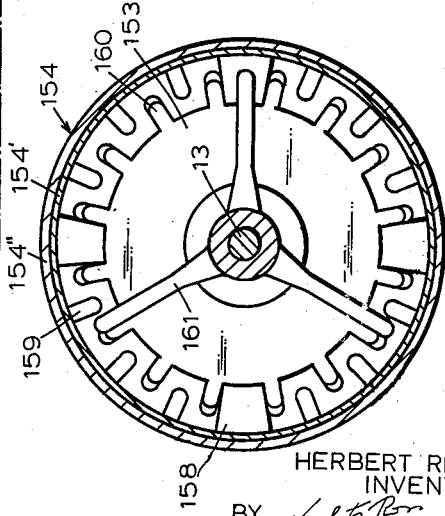
HERBERT REES
INVENTOR
BY
AGENT

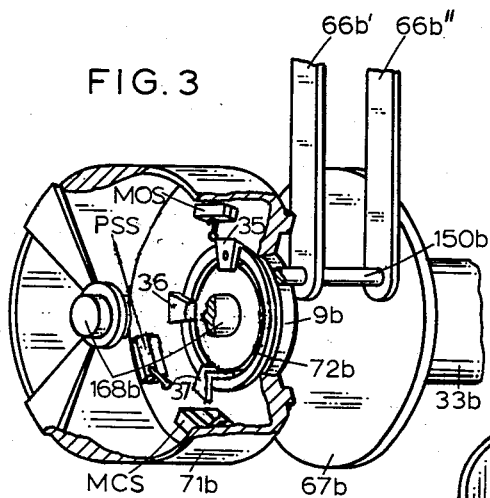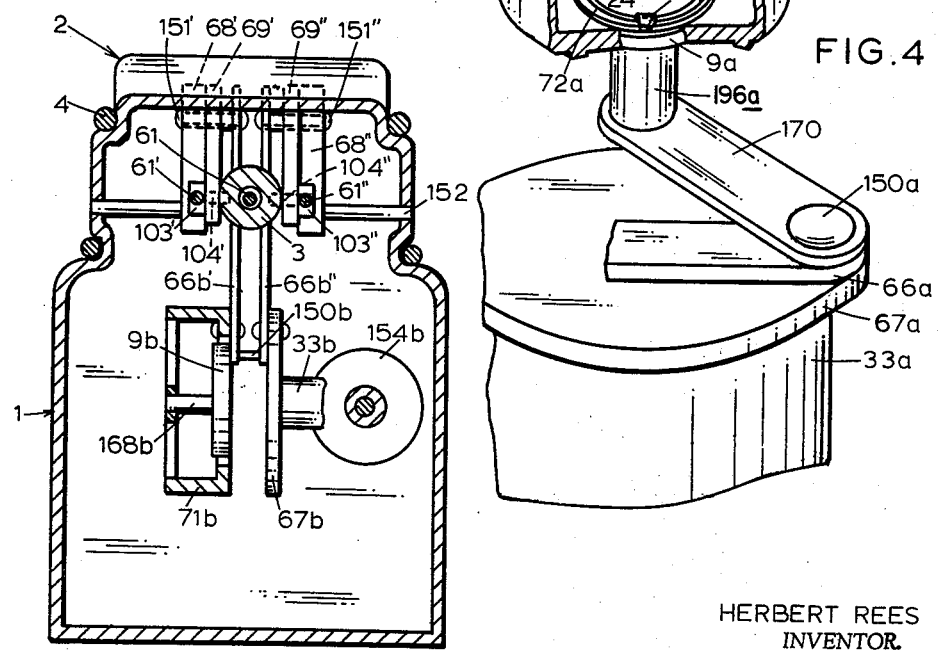

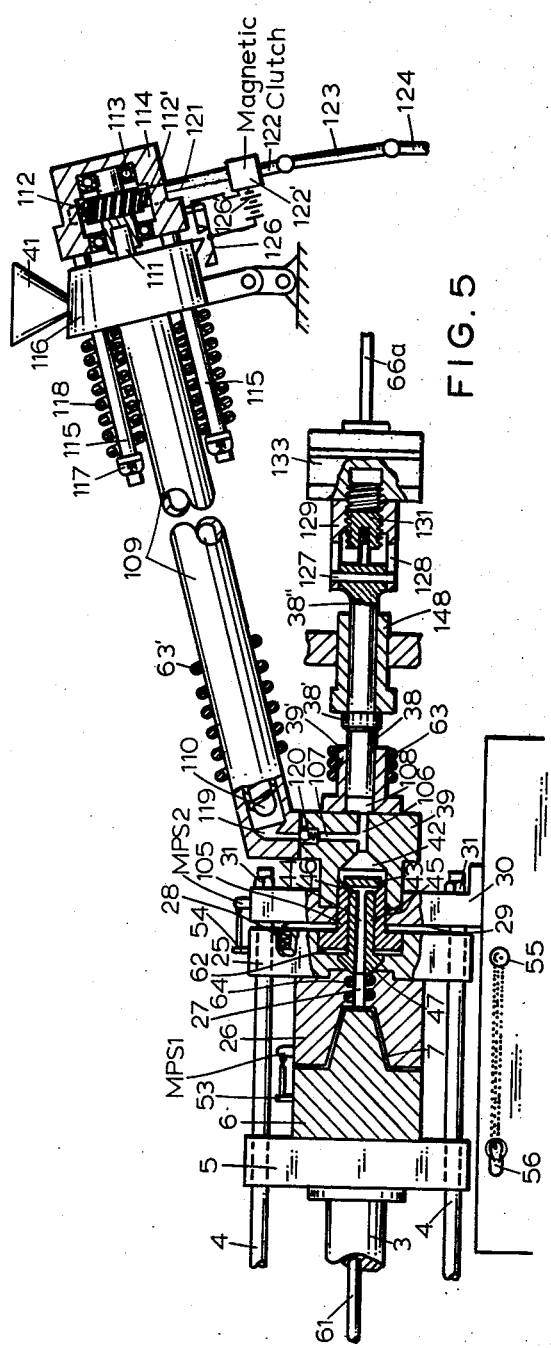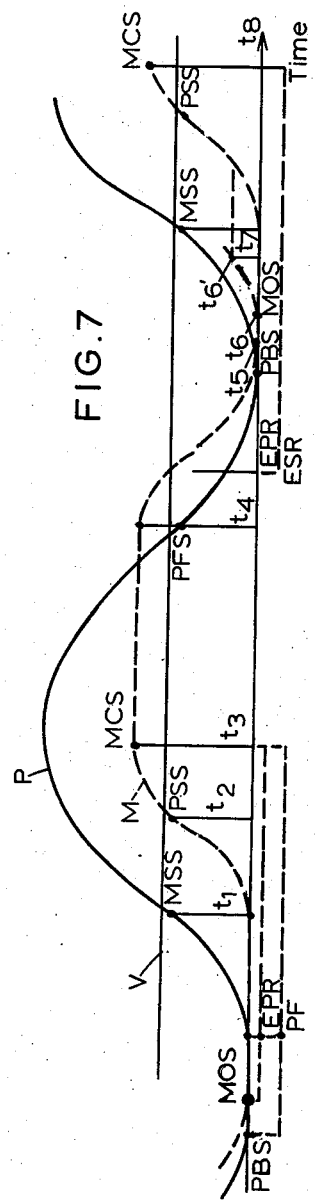
HERBERT REES
INVENTOR.
AGENT

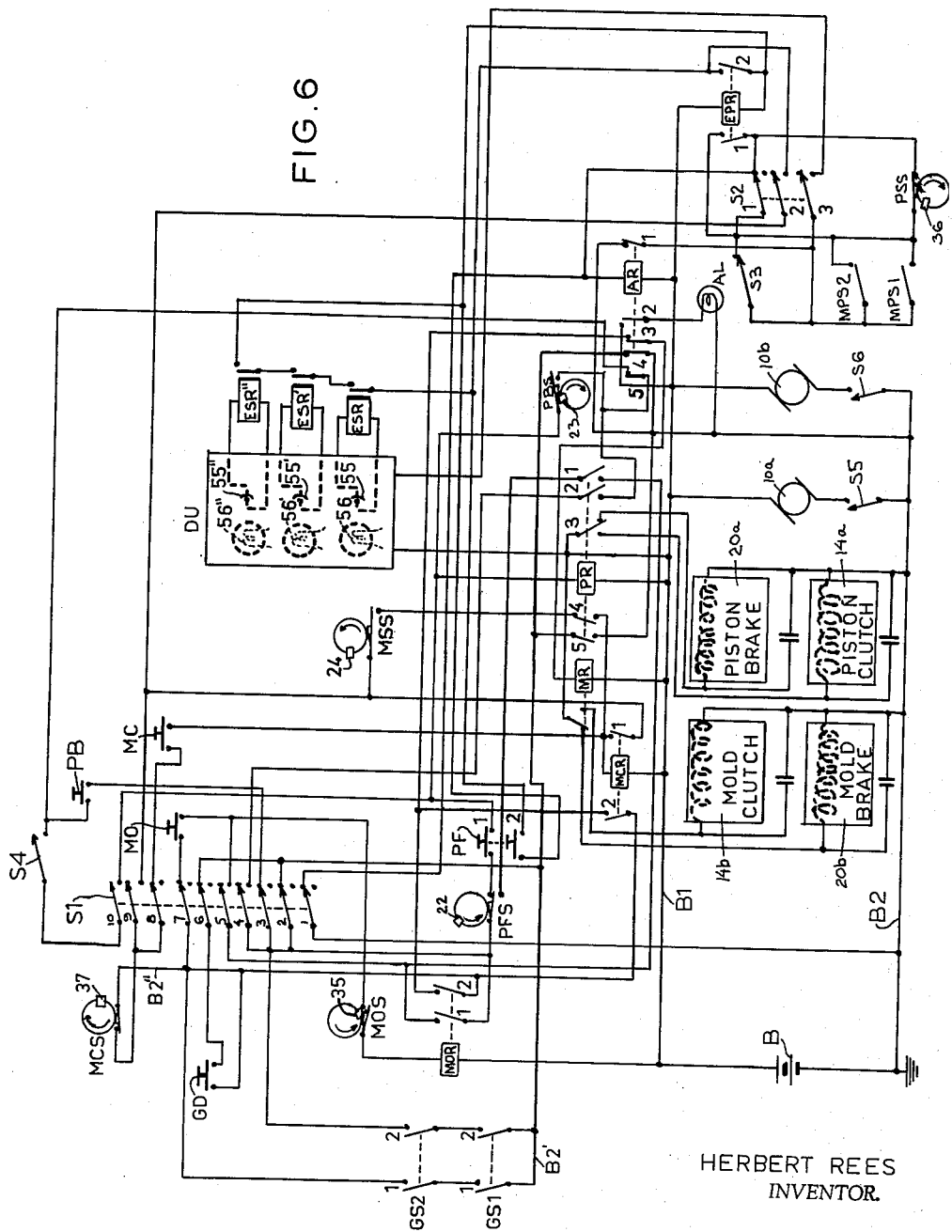

Jan. 14, 1964   H. REES   3,117,348
INJECTION-MOLDING MACHINE
Filed Jan. 22, 1962   7 Sheets-Sheet 6

HERBERT REES
INVENTOR.

BY
AGENT

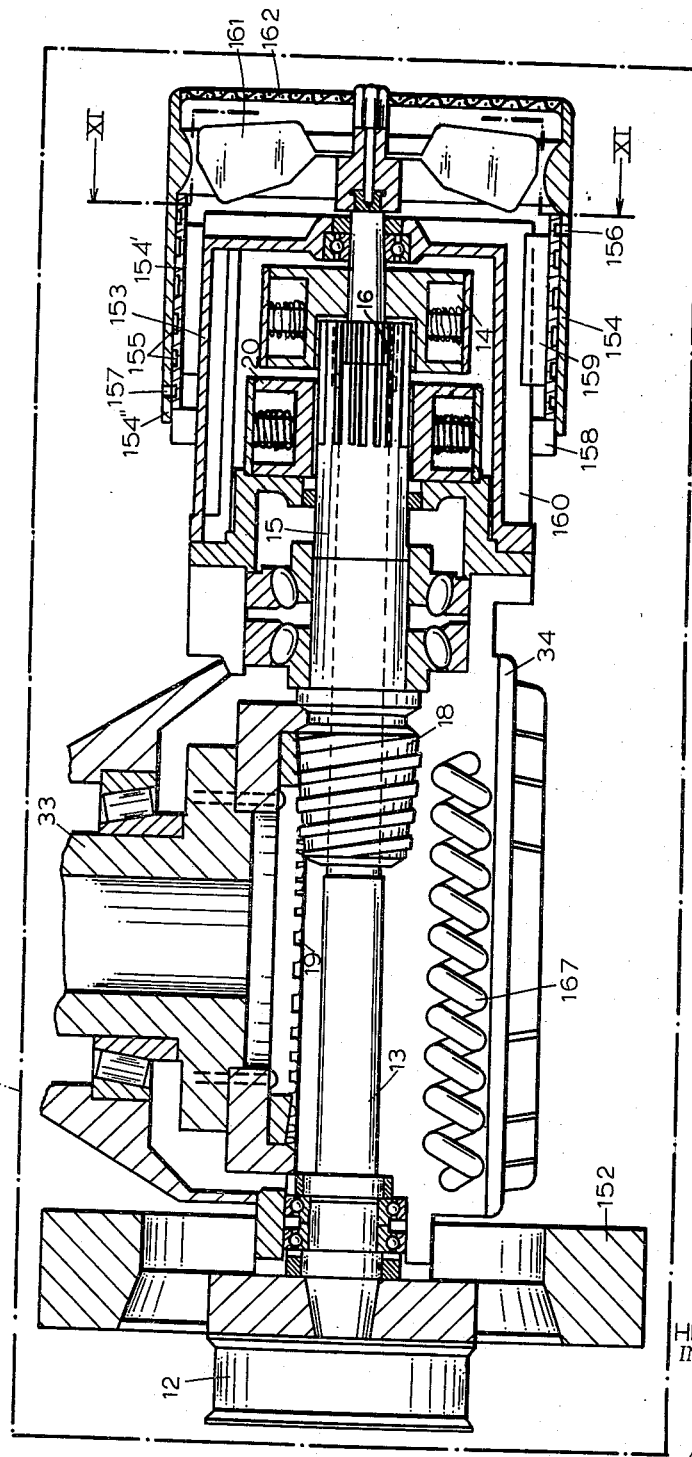

United States Patent Office 3,117,348
Patented Jan. 14, 1964

3,117,348
INJECTION-MOLDING MACHINE
Herbert Rees, Willowdale, Ontario, Canada, assignor to Robert Dietrich Schad, Toronto, Ontario, Canada
Filed Jan. 22, 1962, Ser. No. 167,825
15 Claims. (Cl. 18—30)

My present invention relates to an injection-molding machine, more particularly (but not exclusively) a machine used for the molding of thermoplastic materials to form thin-walled articles such as drinking cups and other disposable containers.

This application is a continuation-in-part of my application Ser. No. 83,068 filed January 16, 1961, now abandoned.

The molding of thin-walled articles poses particular problems not ordinarily encountered in this art. Thus, the rapid rate of hardening occurring within the narrow cavity space of a mold design for such articles requires the use of special injection techniques whereby the admission of the flowable molding material into the or each cavity takes place substantially instantaneously and under high pressure. Although such techniques are known per se, the accurate timing of the injection in relation to the closing and opening of the mold by conventional means presents considerable difficulties due to the short intervals involved. This condition is aggravated by the demand for rapid operation so that articles of this type, which generally must be sold in large quantities and at low unit cost, can be mass-produced at an economical rate.

In my above-identified application I have disclosed an improved control system for an injection-molding machine of the character set forth in which high speed, precise timing and safety of operation are assured through the provision of an actuating mechanism for an injection piston and a mold-closing ram wherein the injection piston is continuously operable by a master drive while the ram is operated intermittently under the control of limit switches actuated in part by its own drive and in part by the piston drive. This insures proper synchrinism between the two drives while also enabling the piston to execute a simple harmonic motion with a minimum of driving energy.

It is an object of this invention to provide a further improvement in the operation of such a machine by facilitating the admission of injectable molding material into a mold cavity by means of a continuously reciprocable piston as described above.

Another object of my instant invention is to provide means for softening the impact of such piston upon the material to be injected while enabling convenient adjustment of the effective piston stroke.

A further object of my invention is to provide means for effectively cooling a circulating hydraulic fluid adapted to be used not only for lubrication purposes but also for the aforementioned impact-softening means.

As also disclosed in my copending application, means may be provided for arresting the two drives whenever, because of some malfunction, the molded products are not discharged from their cavities and/or closure of the mold is prevented for any cause. It is an additional object of my instant invention to provide means whereby, in the case of such malfunction, the mold-closing ram comes to an instantaneous stop whereas the injector drive continues to a predetermined piston position preparatorily to the starting of a new cycle upon, for example, the removal of a mold-blocking obstruction.

In accordance with a feature of this invention I provide, in combination with a continuously reciprocating piston, an auxiliary compressor assembly for the injectable material including a spring-loaded feed screw which, rotating preferably continuously under normal operating conditions, forces this material into a precompression chamber under a pressure which is maintained substantially constant as the screw is progressively retracted against its spring force up to the instant when a valve normally blocking this chamber is opened to admit the material into the mold cavity or cavities at the proper point of the cycle. The valve may, in a manner known per se, be opened by the limited displacement of a first mold portion under pressure from a ram-driven second mold portion as the mold is closed.

Pursuant to another feature of this invention, reciprocating motion is imparted to the injection piston from a continuously rotating crank shaft not directly but through the intermediary of a fluid cushion. Advantageously, an adjustable lost-motion coupling is also interposed between the piston and the crank shaft for varying the effective stroke length. The combination of both measures enables a substantially impact-free operation over a wide range of adjustment.

A further feature of the invention resides in the provision of a magnetic coupling between a drive shaft and a crank shaft for the ram drive and/or the piston drive, this coupling being provided with a housing which forms a preferably helicoidal path for the passage of a hydraulic and/or lubricating fluid, such as oil, by a stream of cooling air generated by the continuously rotating driveshaft. Some of the oil so cooled is, advantageously, used for the fluid cushion of the piston drive.

Whereas in my earlier application I have disclosed a master relay which locks upon the momentary closure of a starting switch and maintains the various operating circuits until its own holding circuit is broken by the operator or by a malfunction detector, I now propose, in accordance with still another feature of this invention, to make only the mold drive directly dependent upon the operation of this master relay and to provide a separate circuit for a piston-control relay which is deactivated only in response to actuation of a limit switch by the piston drive whereby the piston is invariably returned to its starting position, preferably at or near the dead center of its travel remote from the mold cavity. This enables the auxiliary compressor assembly to maintain the precompression chamber filled with injectable material preparatorily to the next forward stroke of the piston. The duration of any forced interruption of the operating cycle of the machine is thereby reduced to a minimum.

The above and other objects, features and advantages of my invention become more fully apparent from the following detailed description, reference being made to the accompanying drawing in which:

FIG. 2 is a detailed view, drawn to a larger scale, of the principal elements of the injection drive of the machine shown in FIG. 1;

FIGS. 3 and 4 are perspective views (parts broken away) of cam-operated switches respectively associated with the mold and injection drives;

FIG. 5 is a sectional elevational view of the mold and adjacent parts of the injection system;

FIG. 6 is a circuit diagram of the electric components associated with the machine of FIG. 1;

FIG. 7 is a graph ilustrating the timed relationship between the movements of the injection piston and of the movable mold portion;

FIG. 8 is a sectional view taken on the line VIII—VIII of FIG. 1;

FIGS. 9 and 10 are partial views of the system of FIG. 2, drawn to a still larger scale and illustrating details within the rectangles IX and X thereof, respectively; and FIG. 11 is a sectional view taken on the line XI—XI of FIG. 10.

Figure 1:
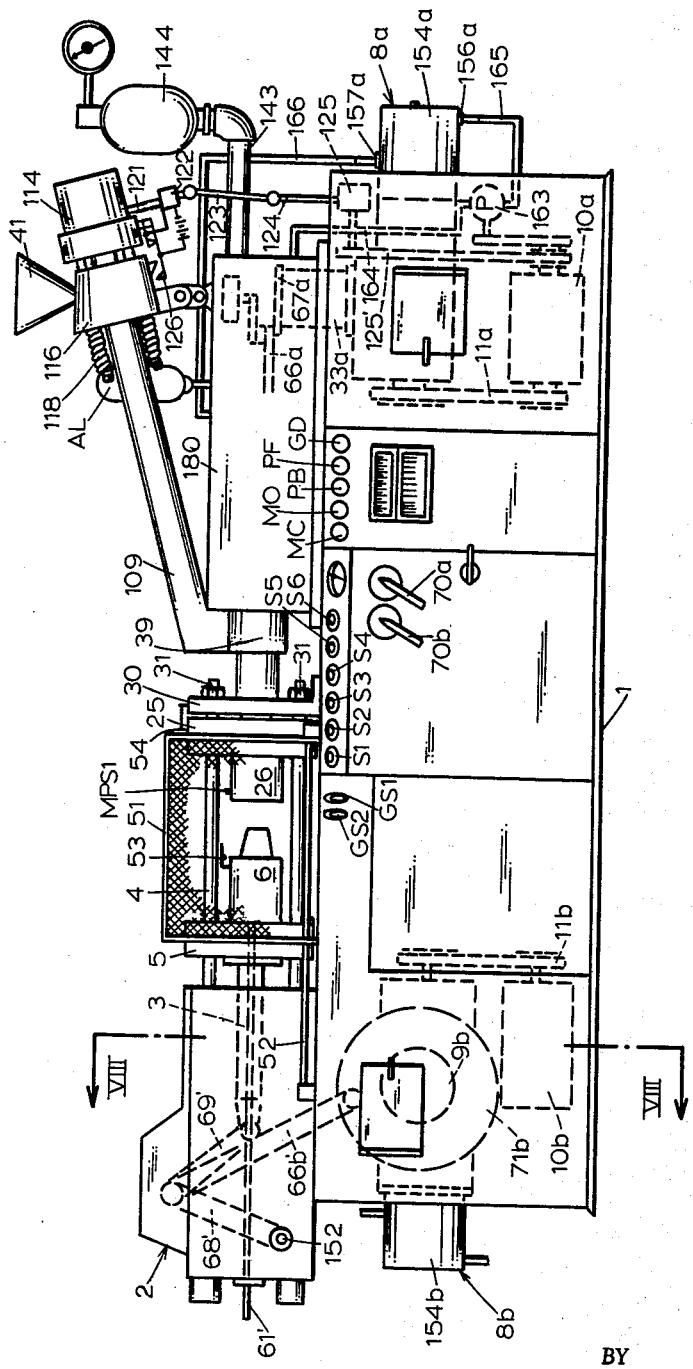
FIG. 1 is an elevational view of an injection-molding machine representing a preferred embodiment of the invention.
Figure 9:
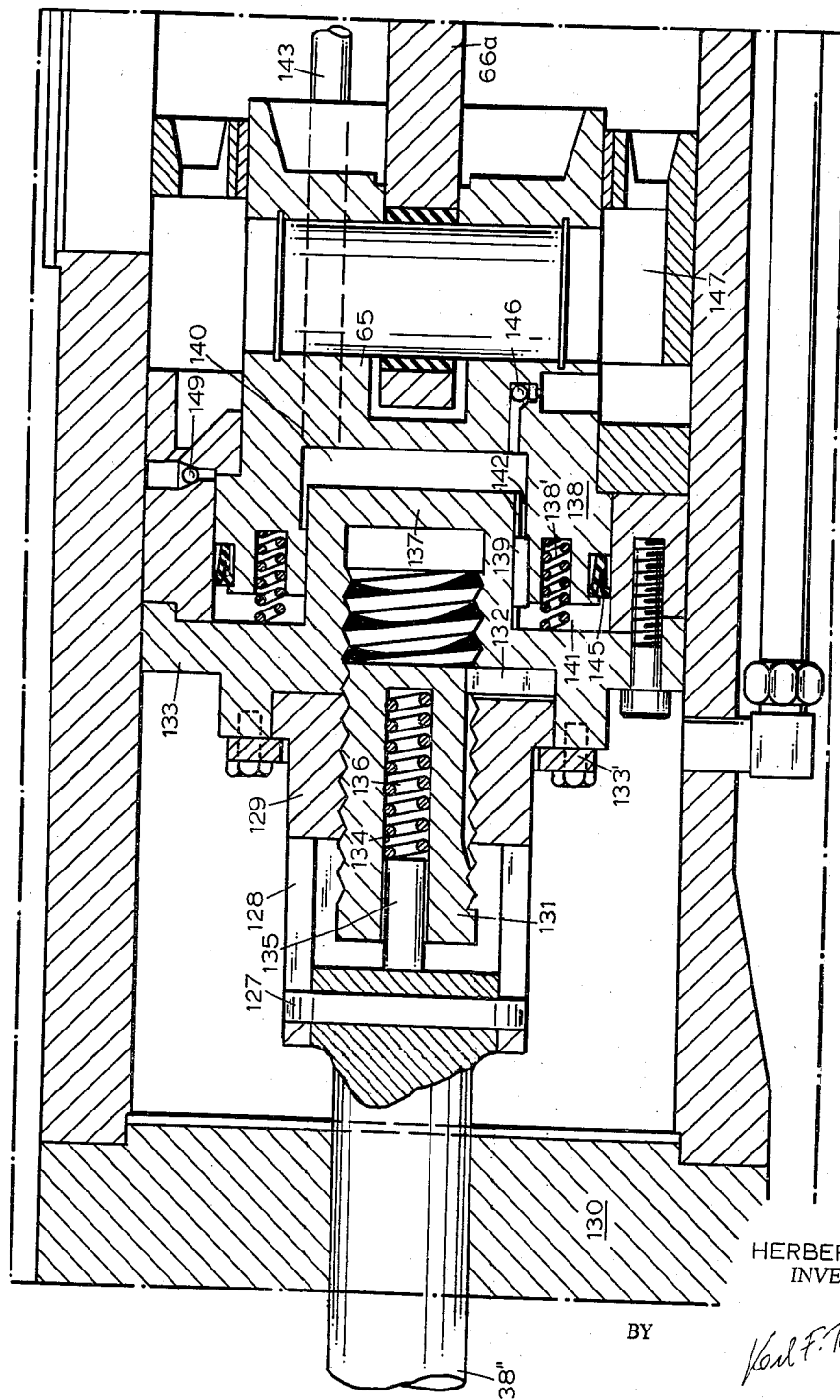

The machine illustrated in FIGS. 1–5 and 8–11 comprises a base 1 supporting a clamping unit 2, the latter being provided with a horizontally movable ram 3 supporting a mold platen 5. The platen 5 is slidably guided on a set of tie bars 4 which are anchored by nuts 31 to a backing plate 30. A pair of horizontal rods 61', 61" slidably support a pair of cross-heads 103', 103" which are linked by respective pivot studs 104', 104" with the outer end of ram 3, the latter being coaxially traversed by a similar rod 61. A second platen 25 is positioned on the tie bars 4 in front of backing plate 30 from which it is held spaced apart with small clearance 29 by compression springs 28 (only one shown). A movable mold portion 6 and a substantially stationary mold portion 26 are respectively secured to the platen 5 and 25; mold portion 26 partakes only of the limited mobility of platen 25 afforded by the compressibility of the springs 28. The fixedly positioned rods 61, 61', 61" are aligned with channels in platen 5 and mold portion 6 for ejecting the molded articles from respective cavities of the mold (here assumed to be of the three-cavity type) when the platen 5 with the mold portion 6 is retracted to its extreme left-hand position as viewed in FIGS. 1 and 5.

The mold portion 26 is formed with several injection orifices 27 each leading to a respective mold cavity; one such cavity, formed between a frustoconical recess in female mold portion 26 and a complementary projection in male mold portion 6, is visible at 7 in FIG. 5. The interconnected orifices 27 communicate with a stepped bore 62 in platen 25, this bore being partly occupied by a plug 47 rigid with the mold-side extremity of a valve stem 45 provided with an axial injection channel 44. The opposite extremity of stem 45 terminates in a head 43 and is provided, just forwardly of this head, with a plurality of inlet apertures 46 which communicate with channel 44 but are normally blocked by the end face of a bushing 105 which slidably receives the stem 45 and extends through plate 30 into a passage 42 in an injection cylinder 39 within which the valve 43–47 is limitedly movable. It will be seen that the passage 42 forms a seat for the valve head 43 and that this passage is blocked by the valve 43–47 when the latter is in the position illustrated in FIG. 5, i.e. with its head 43 resting against bushing 105. In this position the plug 47 is located close to mold portion 26 so as to be displaceable thereby to the right (as viewed in FIG. 5); such rightward displacement opens a path for the admission of liquefied plastic material from passage 42 through inlets 46, channel 44 and orifice 27 into cavity 7.

The introduction of the charge of comminuted plastic material into passage 42 takes place through the horizontal leg 106 of a T-shaped injection channel in cylinder 39 having also a vertical leg 107; channel portion 106 serves to connect the passage 42 with a bore 108 of larger caliber in which a piston 38 is reciprocable. The plastic material is delivered via a hopper 41 to an inclined supply cylinder 109 provided with a feed screw 110 whose shaft 111, carrying a worm gear 112, is lodged in a thrust bearing 113 within a housing 114 which is axially slidable relatively to cylinder 109. Rods 115, projecting rigidly from housing 114, pass for this purpose through a flange 116 of cylinder 109 and terminate in nuts 117 which are under pressure from coil springs 118 tending to displace the housing 114 and the screw 110 to the left as viewed in FIG. 5, i.e. toward the head 39. The screw channel 119 of cylinder 109 communicates via a check valve 120 with the vertical leg of injection channel 107. The worm gear 112 of screw 110 meshes with a worm 112' whose shaft 121 is driven via a flexible linkage, including a rod 122 articulated to a rod 123, by a shaft 124 which is articulated to rod 123 and obtains its rotation from a transmission 125 driven by a belt 125' from a motor 10a (FIG. 1); a magnetic clutch 122' is interposed between the rods 121, 122 and has an energizing circuit including a power source (symbolized by a battery 126') and a circuit breaker 126 which opens whenever the housing 114 with screw 110 reaches a predetermined limit in its motion against the force of springs 118 to cut off the rotation of the screw. These springs are so strong that the rotating screw will impart a predetermined initial compression to the charge in precompression chamber 42, 106, 108 (with valve 43–47 closed) until the reaction forces the screw upwardly in cylinder 109 so that the precompression will be substantially maintained at a chosen maximum. Ordinarily, the advance of piston 38 and the eventual opening of injection valve 43–47 will occur during this retraction of screw 110 which, owing to the presence of check valve 120, is unaffected by the further increase in pressure due to the piston movement. Thus, the circuit breaker 126 will be unoperated in the normal use of the machine and will come into play only when a stoppage occurs, the screw 110 being otherwise returned to its starting position by the biasing force of its springs 118 upon the release of the pressure in channel 107 brought about by the opening of the injection valve. It should be noted that blockage of channel 107 upon malfunction of the injection mechanism will also result in an increased pressure in the screw channel 119 and consequently relative displacement of the screw 110 and its housing 114 in such direction as to open circuit breaker 126 so that the latter constitutes a safety switch controlling the screw. Resistance coils 63 and 63' serve to heat the precompression chamber 42, 106, 108 and the screw channel 119, respectively.

As seen in FIG. 5, in which the cover 180 of the piston assembly has been removed, piston 38 is axially displaceable within a cylinder 39' which forms the aforementioned bore 108. The extension cylinder 39' is detachably fixed to the main compression cylinder 39 by suitable means not shown so that a variety of such extension cylinders, having precompression bores 108 of different calibers occupied by their correspondingly dimensioned pistons 38, may be selectively interchanged whereby a piston stroke of predetermined magnitude will effect the displacement of different volumes of the plastic material through bore 106. A shoulder 38' at one end of a rod 38" bears upon the end of piston 38 remote from head 43. The piston 38 is displaced on its forward stroke to the left (FIG. 5) by means of a crank arm 66a as described in greater detail hereinafter; the pressure of the liquefiable material compressed by screw 110 in channels 107, 119 displaces the piston 38 to the right upon retraction of the crank arm. The other end of rod 38" is provided with a transverse pin 127 received in longitudinal slots 128 of a sleeve 129, the rod and the sleeve being guided in a frame 130. Sleeve 129 has a threaded bore into which a cylindrical core 131 is screwed so as to project by a predetermined distance toward rod 38', the core 131 being retained in its adjusted position by a key 132 on a disk 133 to which the sleeve 129 is attached by a ring 133'. A bore 134 in core 131 accommodates a stud 135 which is pressed by a spring 136 toward the pin 127 whereby rod 38" and, with it, piston 38 can be resiliently displaced relatively to sleeve 129, within the limits of slots 128 and core 131, to form a lost-motion linkage therewith.

Disk 133, in turn, has a central boss 137 which is received with clearance in a cup-shaped extension 138 of a cross-head 65 pivotally engaged by crank arm 66a. The disk 133 is held against rotation relative to cross-head 65 by a key 139 while being axially slidable with respect thereto. The spaces 140, 141 between the cross-heads 65 and the disk 133, interconnected by a channel 142, are filled with oil supplied under pressure through a pipe 143 from a bladder 144 (FIG. 1). An annular gasket 145 of bifurcate cross-section substantially prevents leakage of oil out of the spaces 140, 141, which thus encompass a fluid cushion between the crank drive 66a, 65 and the lost-motion coupling 127, 129 of piston 38". A check valve 146 enables additional oil from a sump 147 to enter these spaces if they should have been depleted to such an extent that an appreciable suction is created therein by the rightward displacement of cross-head 65 (FIG. 9), by means of springs 138' interposed between it and the disk 133 upon the retraction of the crank arm 66a as the shoulder 38' of rod 38" strikes an abutment 148 (FIG. 5). Any oil leaking past the seal 145 will help lubricate the outer periphery of cross-head 65 and its extension 138, such oil then draining past a check valve 149 and several passages not further identified into the sump 147.

When the injection chamber is unblocked by a rightward movement of valve 43–47, the compressed and liquefied plastic material rushes at high speed through the orifices 27 into the cavity 7 where it promptly solidifies under the cooling effect of the mold walls which are chilled by the usual means not shown. The region of mold portion 26 adjacent orifice 27 is, however, advantageously also heated, e.g. by a coil 64, to prevent any premature hardening of the plastic which would block the injection channel.

The crank arm 66a is eccentrically articulated to a disk 67a keyed to a vertical shaft 33a (see also FIG. 3). This shaft forms part of a driving mechanism, generally designated 8a in FIG. 1, which operates the above-described injection unit and is powered by the motor 10a via a transmission 11a. A handle 70a serves to regulate the speed of the motor 10a and/or its preferably adjustable transmission 11a. A second handle 70b similarly controls a motor 10b and/or its transmission 11b which powers a driving mechanism 8b associated with the ram 3. The last-mentioned mechanism has a horizontal output shaft 33b positively connected with a disk 67b to which a pair of crank arms 66b', 66b" are eccentrically pivoted by a pin 150b. The other ends of these crank arms are pivotally joined, on opposite sides of rod 61, to two linkages 68', 69' and 68", 69' by means of pintles 151' and 151", the arms 68', 68" being swingable on a fixed transverse rod 152 whereas the arms 69', 69" are traversed by the studs 104', 104", respectively, see FIG. 8.

The driving mechanisms 8a and 8b are substantially identical and are represented in FIG. 10 by the unit 8. This unit is shown to have a housing 34 from which an input or drive shaft 13 and an output or driven shaft 33 project at right angles to each other; shaft 13 carries a flywheel 152 and is keyed to a pulley 12 forming part of a transmission such as the ones illustrated at 11a and 11b in FIG. 1. Also fastened to drive shaft 13 is an electromagnetic clutch member 14 co-operating with a fluted extremity 16 on a tubular shaft 15 which coaxially surrounds the shaft 13 for independent rotation. Shaft 15 is integral with a worm 18 which meshes with a spiroid gear 19 firmly mounted on driven shaft 33. An electromagnetic brake member 20, fixedly anchored to the housing 34, also co-operates with the fluted shaft portion 16 to arrest the tubular shaft 15.

Certain of the elements shown in FIG. 10, identified by the same reference numerals but with the sunfixes "a" or "b" added, can also be found in some of the other figures as parts of the mechanisms 8a and 8b, respectively, and need not be further identified.

The magnetic elements 14 and 20 are surrounded by an extension 153 of housing 34 which in turn is nested in a cylindrical shell 154 composed of two parts 154', 154". The inner part 154' is formed along its outer peripheral surface with a helical channel 155 which is closed by the outer part 154" except for an entrance port 156 and an exit port 157. Shell 154, which is fixedly supported on housing extension 153 by means of peripherally spaced lugs 158, is formed with a series of axially extending ribs 159 which spacedly lie along the inner circumference of its part 154" and are interleaved with similar ribs 160 rising from the housing part 153. A set of fan blades 161 on the free end of the continuously rotating shaft 13 draw a stream of ambient air through the screened end 162 of housing extension 153 and blow it outwardly between the lugs 158, the air thus passing through the longitudinal channels defined by ribs 159, 160 to cool a flow of oil continuously circulated through the channel 155 of shell 154. In the case of shell 154a, as shown in FIG. 1, this oil flow is created by a pump 163 which draws the oil through a conduit 164 from sump 147 and drives it through a conduit 165 into the entrance port 156a, the oil then passing from exit port 157a into a conduit 166 which delivers it to the top of the machine housing whence it returns to the sump. An analogous pumping system, not shown, recirculates the oil on the ram side of the machine through the corresponding shell 154b for cooling.

A pool of oil will also collect inside the drive-shaft housings 34a, 34b whose interiors communicate with the sump on the respective machine side through various paths, e.g. between the ball-bearing races of the several shafts. This oil can be separately cooled, e.g. with the aid of a coil 167 (FIG. 10) traversed by water or some other cooling fluid.

The output shafts 33a, 33b of driving mechanisms 8a, 8b are also coupled to a pair of disk-shaped cam carriers 9a, 9b, respectively. These carriers are supported on shafts 168a, 168b coaxial with but spaced from cam shafts 33a, 33b as best seen in FIGS. 3, 4 and 8. Crank disk 67a is coupled with carrier 9a by way of an eccentric pin 150a, representing the fulcrum of its crank arm 66a, in substantially the same manner as disk 67b is coupled with carrier 9b through the intermediary of pin 150b on which the crank arms 66b', 66b" are fulcrumed. As shown in FIG. 4, the connection between pin 150a and carrier 9a also includes an arm 170 rigid with carrier shaft 196a. The separation of shafts 33a, 33b from shafts 168a, 168b, respectively, enables in each case the unhindered movement of the associated crank arm or arms.

Each of carriers 9a, 9b is formed with a circular groove 72a, 72b serving as a common track for a set of three camming elements 22, 23, 24 (FIG. 4) and 35, 36, 37 (FIG. 3). Each camming element is adjustably securable in an angular position along its track, though it is to be understood that the relative order of the three elements of each set remains unchanged. Co-operating with the camming elements 22–24 of shaft 33a (FIG. 4), and mounted on a fixed support 71a concentric therewith, are three stationary micrometricswitches including a piston-forward switch PFS, a piston-back switch PBS and a mold-start switch MSS, respectively. In analogous manner, the camming elements 35–37 of shaft 33b (FIG. 3) respectively co-operate with a mold-open switch MOS, a piston-start switch PSS and a mold-closed switch MCS also mounted on a surrounding stationary support 71b.

FIG. 5 shows two further limit switches, i.e. a first and a second mold-protection switch MPS1 and MPS2 respectively carried by the mold portion 26 and by the backing plate 30. Switch MPS1 is actuatable by a pusher finger 53 on mold portion 6 upon complete closure of the mold 6, 26; switch MPS2 is similarly actuatable by a pusher finger 54 on platen 25 upon a backward displacement (to the right in FIG. 5) of that platen by the oncoming mold portion 6. Both these switches operate when the mold closes properly. If, however, foreign matter between the portions 6 and 26 prevents complete closure of the mold, switch MPS1 will remain unoperated while switch MPS2 is actuated whereby a malfunction is indicated. As a result, by the circuit arrangement described hereinafter, the machine will come to a standstill.

Another safety feature resides in the provision of a set of detectors to ascertain the proper ejection of a molded article from each cavity 7. Each detector, shown in FIG. 5, comprises a photoelectric cell 55 illuminated by a light source 56, the illuminating beam being interrupted by the falling of an ejected article from the associated cavity.

If such an interruption does not occur at the proper period during the operating cycle of the machine, the same is stopped.

Other safety features, illustrated in FIG. 1, include the provision of a pair of gates 51 (only one shown) which are slidable on rails 52 and, when properly positioned on both sides of the mold, close respective switches GS1 and GS2.

The machine shown in FIG. 1 also includes an alarm lamp AL (preferably red) and a number of handle-operated and push-button-operated switches whose functions will be described in detail with reference to FIG. 6. These switches are a master selector switch S1 for changing from manual (i.e. pushbutton-controlled) operation to single-cycle or continuous automatic operation and vice versa; a cutout switch S2 for disabling the ejection-protection system controlled by the detectors 55, 56 whenever such protection is not needed, as during manual or single-cycle operation; another cutout switch S3 for similarly disabling the mold-protection switches MPS1 and MPS2; an ancillary selector switch S4 for changing from single-cycle to continuous automatic operation or vice versa; switches S5 and S6 for energizing the motors 10a and 10b, respectively; and a series of pushbutton switches GD, PF, PB, MO, MC referred to hereinafter.

As illustrated in FIG. 6. switch S1 has ten contacts while switch S2 has three; the other control switches are of the single-pole, single-throw type. The system further includes an alarm relay AR, an ejection-protection relay EPR, a plurality of cascade-connected ejection-signaling relays ESR, ESR', ESR'' controlled by respective discharge detectors constituted by lamps 56, 56', 56'' and associated photocells 55, 55', 55'' in a detector unit DU, a mold relay MR, a piston relay PR, a mold-closing relay MCR and a mold-opening relay MOR. Power is supplied to the system by a source of electric current, here shown schematically as a battery B, via a pair of bus bars B1, B2.

When power is first connected to the system, relay AR is energized via the No. 1 contact of switch S1 and locks over its No. 1 armature in series with cam-operated switch PSS and either or both of mold-protection switches MPS1, MPS2 which in the illustrated position are shunted by the closed switch S3; it will be noted that switch MPS1 is normally open while switch MPS2 is normally closed. Relay AR, at its No. 2 armature, opens the energizing circuit of alarm lamp AL which thus is normally extinguished; at its No. 4 armature it extends ground from bus bar B2 to an auxiliary bus bar B2'.

With switches S5 and S6 closed to energize the motors 10a and 10b, the system is now ready for manual operation. If both the molding unit and the injection unit are in starting position (ram 3 on extreme left and piston 38 on extreme right as viewed in FIGS. 1 and 5), piston-back switch PBS and mold-open switch MOS are held open by cams 23 and 35, respectively. Gate switches GS1 and GS2 should be closed through proper positioning of the gates 51, unless the operator depresses gate-defeat switch GD whose closure in series with the No. 6 contact of switch S1 shunts their No. 1 contacts; either switch action extends ground from bus bar B2' to another auxiliary bus bar B2''. The No. 2 contacts of switches GS1 and GS2 are shunted at this stage by the No. 2 contact of switch S1.

Actuation of piston-forward pushbutton PF now energizes the piston relay PR in a circuit extending from bus bar B1 through the winding of that relay, No. 1 contact of pushbutton PF and the closed break contact of piston-forward switch PFS to ground on the No. 2 contact of switch S1. Relay PR, over its No. 3 armature, disconnects bus bar B1 from piston brake 20a and connects it instead to piston clutch 14a whereby the piston 38 is displaced over the forward or injection stroke of its cycle. The attraction of the remaining armatures of relay PR, as also the closure of switch PBS upon the removal of the piston from its home position, is without effect at this time.

The forward stroke of piston 38 continues, as long as button PF is held depressed, until cam 22 reverses the piston-forward switch PFS at a selected point of its cycle, i.e. until the desired degree of compression has been imparted to the moldable mass in passage 42, 106, 108. Prior to the termination of the piston movement, or subsequently thereto, the operator will depress mold-closing pushbutton MC to energize mold-closing relay MCR in a circuit extending between bus bars B1 and B2'' via switch MCS and the No. 8 contact of switch S1. Relay MCR, over its No. 2 armature, energizes mold relay MR, in a circuit between bus bars B1, B2' which includes the No. 3 armature of relay AR, to effect the release of mold brake 20b with concurrent activation of mold clutch 14b; this causes the ram 3 to advance to mold portion 6 on platen 5 toward closed position.

When the mold 6, 26 closes, switch MCS is opened by cam 37 to de-energize the relay MCR and, consequently, to release the relay MR so that the mold stops. The slight rightward displacement of mold portion 26 (FIG. 5) at the end of the ram stroke opens the valve 43–47 so that the compressed and liquefied molding material to the left of piston 38 squirts into each mold cavity 7. The piston, which had come to rest upon the release of relay PR with the deactivation of clutch 14a and reoperation of brake 20a, may thereupon be retracted by actuation of piston-back pushbutton PB whereby relay PR is once more energized in a circuit extending from bus bar B1 through its winding, closed switch PBS, button PB, and the Nos. 3 and 2 contacts of switch S1 to bus bar B2'. Piston 38 now completes its cycle, relay PR remaining operated while pushbutton PB is held until the cam 23 again opens the switch PBS. During that period, or thereafter, the operator opens the mold by actuating mold-opening pushbutton MO to energize the mold-opening relay MOR in a circuit which includes switch MOS and the No. 7 contact of selector switch S1. Relay MOR, by its No. 2 armature, reoperates the mold relay MR over the No. 3 armature of relay AR to return the ram 3 to its starting position where it stops as the cam 35 opens the switch MOS; the system has now returned to its initial state and the same cycle of operations can be repeated.

Normally, the sequence of manual operations just described will be used only for test runs and, before mass production is started, will be followed by one or more single-cycle pilot runs during which switch S1 is in its alternate position. Now, a brief actuation of pushbutton PF will initiate a full operating cycle as relay PR, immediately after having set in motion the piston 38, locks over switch PBS, its own No. 2 armature, closed No. 4 contact of switch S1, and the No. 2 contacts of gate switches GS1 and GS2 which must be closed at this stage. At a selected point of its forward stroke, determined by the amount of added compression which it is desired to impart to the material under compaction in passage 42, 106, 108, cam 24 closes the mold-start switch MSS whereby a circuit is closed from bus bar B1 through the winding of relay MCR, No. 4 armature of relay PR, switch MSS, No. 9 contact of switch S1, and switch MCS to bus bar B2''. Relay MCR, in operating, locks over its No. 1 armature and switch MCS, while at its No. 2 armature its energizes the mold relay MR to set the ram 3 in motion.

With suitable selection of the relative speeds of ram 3 and piston 38, as controlled by handles 70a and 70b in FIG. 1, and with proper setting of cam 24 the mold will close at exactly the right point of the piston stroke. At some instant during mold closure, cam 36 will momentarily open the switch PSS which, however, will have no effect upon the operation of the system under these circumstances since switch PSS is shunted by the No. 1 contact of switch S2; similarly, the operation of switch contacts MPS1 and MPS2 just before mold closure will be without consequences in view of the shunting effect of switch S3.

When the mold closes, switch MCS is again opened by cam 37 to break the holding circuit of relay MCR which releases and de-energizes the relay MR. Thus, ram 3 comes to a halt while piston 38 continues its reciprocation. At another selected point of its cycle, which may be near the forward dead-center position of the piston or closer to the other extremity of its path, cam 22 reverses the switch PFS to close its make contact whereby mold-opening relay MOR is energized over a circuit which may be traced from bus bar B1 through the winding of that relay, thence via switch MOS, No. 5 contact of switch S1, No. 1 armature of relay PR which is still operated, switch PFS and closed No. 2 contacts of switches GS2, GS1 to bus bar B2'. Relay MOR locks over its No. 1 armature, in series with switch MOS and the No. 5 contact of switch S1, and by its No. 2 armature re-energizes relay MR to drive the ram 3 back to its starting position in which cam 35 reopens switch MOS to arrest the ram. The return stroke of the piston 38, similarly, comes to an end in the extreme withdrawn position of the piston in which switch PBS is opened by cam 23 to break the holding circuit of relay PR. It should be noted that, depending upon the relative speeds of the respective drives and the setting of the associated cams, the injection piston 38 may reach its resting position before, after or at the same time as the mold-operating ram 3.

The automatic operation of the system has been illustrated diagrammatically in FIG. 7 in which the reciprocations of the piston 38 and the mold support 3, 5 have been shown by the curves P and M, respectively. The time axis or abscissa represents the retracted position of each element, i.e. left for the ram 3 and right for the piston 38 as viewed in FIGS. 1 and 5. At the instant of start, designated $t_0$, the two elements are at rest and button PF is actuated to initiate the reciprocations of first the piston and then the ram with a delay determined by the setting of cam 24. The latter, at instant $t_1$, closes mold-start switch MSS to begin the forward stroke of the movable mold portion which continues through instant $t_2$, when switch PSS is opened ineffectually, up to instant $t_3$ when the mold is stopped by the switch MCS. Piston 38 continues its motion; at instant $t_4$ it operates switch PFS to restart the mold movement, its own travel thereafter coming to a halt at instant $t_5$ with the opening of switch PBS. The mold-return stroke is terminated at instant $t_6$ by the switch MOS.

It will be observed that the reversal of selector switch S1 has opened its No. 1 contact so that the energization of relay AR, which insures the continuity between bus bar B2, on the one hand, and its extension B2', B2", on the other, is now maintained only over the No. 1 armature of alarm relay AR in series with contacts of cutout switches S2 and S3. Thus, the operator may render the protective devices DU, MPS1, MPS2 effective by reversing these cutout switches concurrently with the actuation of selector switch S4 to change from single-cycle operation to continuous recycling. Switch S4, when closed in series with the No. 10 contact of switch S1 and the No. 5 armature of relay AR, shunts the cam-operated switch PBS so that the latter does not arrest the piston drive at instant $t_5$. Thus, the piston continues to reciprocate, and, at instant $t_7$, reoperates switch MSS to start the mold cycle anew.

With switch S3 open, the presence of an obstruction between mold portions 6 and 26 at the moment of closure breaks the molding circuit of alarm relay AR since in that case both switches MPS1 and MPS2 will be open simultaneously; this action de-energizes relay AR and at its No. 4 armature opens one connection between ground and bus bars B2', B2" and de-energizes relay MR with consequent cessation of motion of ram 3. Relay AR, in releasing, at its No. 2 armature and back contact closes a circuit to light the lamp AL, thereby indicating the existence of a malfunction which has halted the operation of the machine.

As, however, a connection between bus bars B2 and B2' is still maintained at this stage by the No. 5 armature of relay PR which shunts the No. 4 armature of relay AR, the former remains energized under the control of cam switch PBS (the shunt circuit through switch S4 having been broken at the No. 5 armature of relay AR) so that the piston 38 will be arrested only upon arrival in its withdrawn position, at the stage of its particular cycle corresponding to instant $t_5$, with release of relay PR.

When production is started by actuation of pushbutton PF with switch S2 in its alternate position, a circuit is closed from bus bar B1 through the winding of ejection-protection relay EPR, No. 2 contacts of pushbutton PF and switch S2, No. 9 contact of switch S1 and closed contact MCS to bus bar B2" whereby relay EPR is operated and locks, independently of that pushbutton, over its No. 2 armature. The No. 1 armature of relay EPR then shunts the switch PSS so that, during the first cycle of operation, the opening of this switch by cam 36 at instant $t_2$ will still be without effect. Subsequently, at instant $t_3$, switch MCS when opened by cam 37 breaks the holding circuit of relay EPR so that the latter releases.

When the mold opens after instant $t_4$, the molded articles are discharged therefrom in the usual manner and, in dropping from the mold, interrupt the light beams of lamps 56, 56', 56", respectively. This action momentarily releases the associated signal relays ESR, ESR', ESR" which are sufficiently slow-operating to insure that their serially interconnected armatures engage their respective back contacts concurrently, thereby closing an alternate circuit for relay EPR which locks in the aforedescribed way. This action again prevents the opening of switch PSS, at instant $t_8$ and corresponding stages, of subsequent cycles, from affecting the operation of the machine.

If, however, the molded articles are not properly discharged from all the cavities 7, relay EPR remains released after instant $t_3$ and the operation of cam 36 upon switch PSS at instant $t_7$ (or corresponding instants of later cycles) breaks the operating cycle of alarm relay AR whereby the latter releases, the machine is arrested and lamp AL is lit in the manner described above.

If the operator desires to stop the machine during normal recycling, he merely opens the switch S4 whereupon the molding and injection units will come to a halt upon the next opening of switch PBS as has been described for single-cycle operation.

In some cases it may be desirable to adjust the cam 35 so that switch MOS will be opened not in the exact dead-center position of ram 3 but with the mold portion 6 brought slightly closer to mold portion 26, e.g., at instant $t_6'$ in FIG. 7, whereby the mold cavities will be free from their ejection rods 61, 61', 61" so that, with pushbutton operation, cleaning of the cavities and the fastening of inserts therein will be facilitated. The position of cam 36, controlling the switch PSS, is in either case advantageously so selected that the ejection test is performed just before the valve E43–47 is opened, as indicated by the horizontal line V in FIG. 7, so that even with an accelerated mold-closing stroke there will be enough time available for the molded articles to be discharged without interference with the operation of the system.

It will thus be seen that I have disclosed a control system of great versatility and efficiency adapted to satisfy the objects set out hereinabove. For the molding of articles having a wall thickness from a fraction of a millimeter, for example, cycling periods ($t_0$–$t_5$) of only a few seconds have been realized thereby with maximum safety of operation and uniformity of production. It should be understood, however, that my invention is not limited to the specific arrangement described and illustrated but that the same may be realized in various modifications and adaptations without departing from the spirit and scope of the appended claims.

I claim:

1. In an injection-molding machine, in combination, a mold provided with a substantially stationary first portion and a movable second portion defining at least one cavity between them, said first portion being provided with at least one injection passage terminating at said cavity; a precompression chamber communicating with said passage; inlet means forming a feed channel terminating at said chamber, said inlet means including supply means for admitting a moldable plastic material to said feed channel at a location remote from said chamber, screw means in said channel extending from said supply means to the vicinity of said chamber, and a power source coupled with said screw means for continuously delivering said material under pressure to said chamber by rotating said screw means; a piston reciprocable in said chamber for periodically expelling said material under pressure into said passage in a succession of operating cycles each including a forward stroke and a return stroke of said piston; first drive means for reciprocating said piston; and second drive means for alternately displacing said second portion into contact with and away from said first portion in timed relationship with said piston whereby said mold is alternately closed for a molding operation and opened for the ejection of a molded article therefrom, said first drive means including a rotatable crank and resilient transmission means connecting said crank with said piston.

2. The combination according to claim 1 wherein said feed channel is so dimensioned as to allow for a limited longitudinal displacement therein of said screw means, said inlet means further including biasing means urging said screw means forwardly toward said chamber against the reaction force of said material, and contact means operable by said screw means in a limiting position remote from said chamber for temporarily deactivating said power source.

3. The combination according to claim 1 wherein said transmission means includes a first link member coupled with said crank, a second link member coupled with said piston and a lost-motion connection between said link members.

4. The combination according to claim 3 wherein said lost-motion connection includes a holder on one of said link members engaging the other of said link members with play, and a resilient bumper on said holder bearing upon said other of said link members in a limiting relative position of said link members.

5. The combination according to claim 1 wherein said transmission means includes a first link member coupled with said crank, a second link member coupled with said piston and coupling means forming a resiliently compressible fluid cushion between said link members.

6. The combination according to claim 5 wherein said link members are provided with interengaging extensions forming a fluid chamber of variable volume therebetween, said coupling means including a source of fluid under pressure and conduit means connecting said source of fluid with said fluid chamber.

7. The combination according to claim 6 wherein said source of fluid comprises an inflatable bladder communicating with said conduit means, further comprising a fluid reservoir outside said fluid chamber and one-way valve means for enabling the influx of fluid from said reservoir into said fluid chamber upon partial depletion of the latter by leakage.

8. In an injection-molding machine, in combination, a mold provided with a substantially stationary first portion and a movable second portion defining at least one cavity between them, said first portion being provided with at least one injection passage terminating at said cavity; a precompression chamber communicating with said passage; inlet means forming a feed channel terminating in a permanently open inlet to said chamber, said inlet means including supply means for admitting a moldable plastic material to said feed channel at a location remote from said chamber, screw means in said channel extending from said supply means to the vicinity of said chamber, and a power source coupled with said screw means for continuously delivering said material under pressure to said chamber by rotating said screw means; a piston reciprocable in said chamber ahead of said inlet for periodically expelling said material under pressure into said passage in a succession of operating cycles each including a forward stroke and a return stroke of said piston; valve means at the junction of said passage with said cavity for blocking said passage during at least part of each forward stroke; first drive means including a motor-driven crank for continuously reciprocating said piston; intermittently operable second drive means for alternately displacing said second portion into contact with and away from said first portion during a forward stroke and a return stroke, respectively, of said piston whereby said mold is alternately closed for a molding operation and opened for the ejection of a molded article therefrom; first switch means controlled by said second drive means for arresting said second portion in the closed position of said mold; mechanism controlled by one of said drive means for temporarily opening said valve means in said closed position; and second switch means controlled by said crank for restarting said second drive means upon admission of said plastic material into said cavity by way of said passage.

9. The combination according to claim 8 wherein said first portion is limitedly displaceable by said second portion upon closure of the mold, said valve means comprising a plug in said chamber projecting toward said first portion for displacement thereby into a non-blocking position upon displacement of said first portion by said second portion.

10. In an injection-molding machine, in combination, a mold provided with a substantially stationary portion and a movable portion defining at least one cavity between them, said substantially stationary portion being provided with at least one injection passage terminating at said cavity; feed means including a permanently open inlet at said passage and a piston reciprocable in said passage ahead of said inlet for injecting a moldable plastic material through said passage into said cavity; first drive means including a motor-driven crank for intermittently operating said feed means by continuously reciprocating said piston; intermittently operable second drive means for alternately displacing said movable portion during a forward stroke and a return stroke of said piston, respectively, into a first position in contact with said substantially stationary portion and a second position away from said stationary portion in timed relationship with said feed means whereby said mold is alternately closed for a molding operation and opened for the ejection of a molded article therefrom; normally closed valve means at the junction of said passage with said cavity; first switch means controlled by said second drive means for inactivating the latter and arresting said movable portion in said first position thereof; second switch means controlled by said crank for restarting said second drive means in a predetermined position of said piston; and mechanism controlled by one of said drive means for temporarily opening said valve means in said first position whereby said plastic material is injected into said cavity prior to restarting of said second drive means.

11. The combination according to claim 10, further comprising third switch means controlled by said second drive means for inactivating the latter and arresting said second portion in said second position thereof, and fourth switch means controlled by said crank for restarting said second drive means during said forward stroke.

12. The combination according to claim 11, further comprising fifth switch means coupled with said crank for inactivating said first drive means at the end of said return stroke, start means including manually operable switch means for initiating another forward stroke of said piston by reactivating said first drive means, and contact means permanently actuatable for rendering ineffective said fifth switch means whereby said piston is continuously reciprocated.

13. The combination according to claim 12, further comprising a protective circuit responsive to improper ejection of said article from said cavity for substantially instantly arresting said second drive means and disabling said contact means for a subsequent stopping of said first drive means under the control of said fifth switch means.

14. The combination according to claim 13 wherein said first portion is limitedly displaceable by the approaching second portion upon closure of the mold, said protective circuit including first switch contacts actuatable by said first portion upon the displacement thereof and second switch contacts on one of said portions actuatable by the other of said portions upon complete closure of the mold.

15. The combination according to claim 13 wherein said protective circuit includes relay means actuatable by one of said drive means at a predetermined stage of an operating cycle and detector means below said mold for rendering said relay means ineffectual upon the dropping of a molded article from said cavity ahead of said stage.

References Cited in the file of this patent

UNITED STATES PATENTS

| | | |
|---|---|---|
| 2,359,840 | Goessling | Oct. 10, 1944 |
| 2,445,035 | Munger et al. | July 13, 1948 |
| 2,505,540 | Goldhard | Apr. 25, 1950 |
| 2,675,583 | Scherry | Apr. 20, 1954 |
| 2,801,442 | Moslo | Aug. 6, 1957 |
| 2,950,501 | Harkenrider | Aug. 30, 1960 |
| 3,032,819 | Gasmire | May 8, 1962 |

FOREIGN PATENTS

| | | |
|---|---|---|
| 1,145,554 | France | May 6, 1957 |